United States Patent [19]
Liebetrau et al.

[11] Patent Number: 5,615,864
[45] Date of Patent: Apr. 1, 1997

[54] ELEVATOR HOIST APPARATUS WITH TORQUE SUPPORT DEVICE

[75] Inventors: Christoph Liebetrau, Menziken; Utz Richter, Ebikon, both of Switzerland

[73] Assignee: Inventio AG, Hergiswil NW, Switzerland

[21] Appl. No.: 405,996

[22] Filed: Mar. 17, 1995

[30] Foreign Application Priority Data

Mar. 25, 1994 [EP] European Pat. Off. ............ 94104765.6

[51] Int. Cl.$^6$ .................................................. B66D 1/00
[52] U.S. Cl. ........................... 254/329; 254/362; 187/254
[58] Field of Search ................................. 254/332, 329, 254/362; 187/254, 292

[56] References Cited

U.S. PATENT DOCUMENTS

| | | |
|---|---|---|
| 5,010,981 | 4/1991 | Heikkinen . |
| 5,098,068 | 3/1992 | Jussila . |
| 5,291,966 | 3/1994 | Kato . |

FOREIGN PATENT DOCUMENTS

| | | |
|---|---|---|
| 0079420 | 5/1983 | European Pat. Off. . |
| 2608577 | 6/1988 | France . |
| 4312201 | 10/1993 | Germany . |
| 54-112462 | 3/1979 | Japan . |

OTHER PUBLICATIONS

Brochure entitled "Harmonic Drive", first version, May 1991.
Updated brochure entitled "History of CYCLO".
Patent abstracts of Japan, vol. 3, No. 137 (M–80) 14 Nov. 1979.

*Primary Examiner*—Daniel P. Stodola
*Assistant Examiner*—Emmanuel M. Marcelo
*Attorney, Agent, or Firm*—Greenblum & Bernstein P.L.C.

[57] ABSTRACT

Driving machine for lifts. In this simply and compactly constructed driving machine, damages caused by axle sagging and deformations of teeth, which occur during peak loadings, of a transmission are avoided and for this purpose, in the drive unit of this invention the drive pulley is rotatably journalled on one end of a stationary axle, which in turn is fastened on a bearing block arranged on the base plate of a machine frame with the drive unit including a transmission, an electrical motor, a brake and a rotation transmitter being arranged co-axially overhung or cantilevered at the drive pulley and secured against rotation by two elastic torque stays attached to the machine frame, with adjustable damping elements installed in the torque stays enabling a load-moment-dependent deflection of the drive unit in the sense of rotation and thereby also providing a load measurement at the drive unit.

8 Claims, 2 Drawing Sheets

5,615,864

ELEVATOR HOIST APPARATUS WITH TORQUE SUPPORT DEVICE

CROSS REFERENCE TO RELATED APPLICATIONS

This application claims the priority of European Patent Application No. EP 94 104765.6, filed Mar. 25, 1994, the disclosure of which is incorporated herein by reference in its entirety.

BACKGROUND OF THE INVENTION

1. Field of the Invention

The invention pertains to a driving machine or drive unit for lifts or elevators, which includes a transmission, an electric motor, a brake and a drive pulley, all which are coaxially arranged on a machine frame.

2. Discussion of the Background of the Invention and Material Information

The most frequently used transmission for lift or elevator drives are worm drives, in which the axle carrying the worm wheel and the drive pulley is, as a rule, journalled, at its ends, between the worm wheel and the drive pulley. Thus, three bearings journals with at least three rolling element bearings are required. A driving machine, in which the axle is journalled via two bearings is set forth in German Patent Publication DE-OS 43 12 201. In this construction, the worm wheel is overhung, or cantilevered, while the drive pulley is attached to the axle between two bearings secured to a housing. The previously described transmissions have the disadvantage that orientation or alignment problems can arise and greater friction can result via engagement errors arising due to axle deflection. Furthermore, gear teeth can be deformed in the case of short peak loadings, such as for example in the case of safety device and buffer tests, since the briefly occurring torques can reach even up to ten times the nominal torque. The gear pitch errors arising in this case are compensated via increased abrasion in the zone of the deformed teeth. The same situation also applies for the start-up phase of the elevator, since greatly increased loadings can arise in the case of short acceleration times and high mass inertia.

In a prior art driving machine set forth in U.S. Pat. No. 5,010,981, a planetary transmission, which is located radially within the drive pulley, is used for the purpose of improving the comparatively low efficiency of worm drives and for achieving a more compact construction mode. The drive pulley is rotatably journalled by two bearings on a hollow bearing axle which is supported at both sides of the drive pulley and wherein a drive shaft, which is driven by the motor, is doubly journalled. The drive shaft includes a toothing which is in engagement with intermediate wheels or gears which are rotatably journalled at flanges of the bearing axle. The intermediate wheels or gears are in engagement with an internal toothing of the drive pulley so that, when the drive shaft is rotating, the rotational movement is transmitted to the drive pulley with reduced rotational speed. The end of the drive shaft is coupled with a disc brake fastened to the machine frame. This driving machine is built up in a relatively complicated manner, wherein the assembly and disassembly for the purpose of maintenance or repairs is quite time-consuming. In addition, in the case of drives with multiple bearings, both orientation or alignment errors as well as axle deflection must be reckoned with, which can disadvantageously affect the transmission.

SUMMARY OF THE INVENTION

It is an object or task of this invention to produce an elevator driving machine or drive unit of the previously described type, which does not include the noted disadvantages and particularly wherein errors in engagement due to axle deflection and tooth deformation, due to peak loadings, are avoided.

This object is achieved by the invention set forth in the appended claims. In the claimed construction, the drive pulley is rotatably journalled on one end of a stationary axle which is affixed to a carrier connected with the machine frame. The transmission, the electric motor and the brake are operatively interconnected while extending co-axially and being arranged to be overhung or cantilevered at the drive pulley, while being connected with two elastic torque stays attached to the machine frame.

Specifically, this invention pertains to a drive unit for elevators including multiple drive means and a drive pulley, with the drive means and pulley being co-axially mounted on a machine frame, wherein the drive pulley is rotatably journalled on a stationary axle and concentrically coupled by the drive means via at least one elastic torque stay, with the at least one torque stay serving as protection against rotation of the drive means relative to the machine frame.

In a further embodiment of the drive unit of this invention, the drive pulley includes an adapter plate, with a first bearing race being attached to the adapter plate, with the drive means including a housing wherein a second bearing race is attached to the housing, with rolling element bodies being interposed between the first and second bearing races and thereby forming a rolling element bearing therewith, with the rolling element bearing journalling the driving means relative to the drive pulley.

Another embodiment of the drive unit of this invention, further includes the attachment of at least one radial lever, for mounting of at least one torque stay, at a housing of the drive means.

In a differing embodiment of the drive unit of this invention, the at least one elastic torque stay consists of at least one mounting member and a pedestal plate, with each mounting member including pressure plates and damping bodies, with the damping bodies being interposed between radial levers and the pressure plates on at least one torque stay.

In yet a further embodiment of the drive unit of this invention, the pressure plate and the mounting member are adjustable relative to each other.

In yet another embodiment of the drive unit of this invention, the damping bodies consist of an internally damped elastic material.

In yet a differing embodiment of the drive unit of this invention, the drive means includes a planetary gear transmission. Other types of transmissions include commercially marketed "HARMONIC" and "CYCLO" drives.

The advantages achieved by this invention reside in the fact that only one bearing is needed thus decreasing cost and no axle deflecting can occur and cause disadvantageous effects on the transmission and other machine parts. Since only one bearing is required, orientation or alignment problems are avoided, which in an otherwise unsatisfactory solution, could lead to additional wear. Via the use of elastic torque stays, the maximum torques arising during brief peak loadings are reduced and deformations of the gear teeth are also avoided thereby. A further advantage, achievable via the use of the elastic torque stays, results in the oscillation damping of the driving machine. The proposed overhung or cantilever mounting of the transmission, motor and brake, at the drive pulley, results in a compact, space-saving arrangement of the driving machine, with the latter being easily mountable and requiring less maintenance and fewer repairs.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein.

DETAILED DESCRIPTION OF THE PREFERRED EMBODIMENTS AND BEST MODE

With respect to the drawings it is to be understood that only enough of the construction of the invention and the surrounding environment in which the invention is employed have been depicted therein, in order to simplify the illustrations, as needed for those skilled in the art to readily understand the underlying principles and concepts of the invention.

Figure 1:
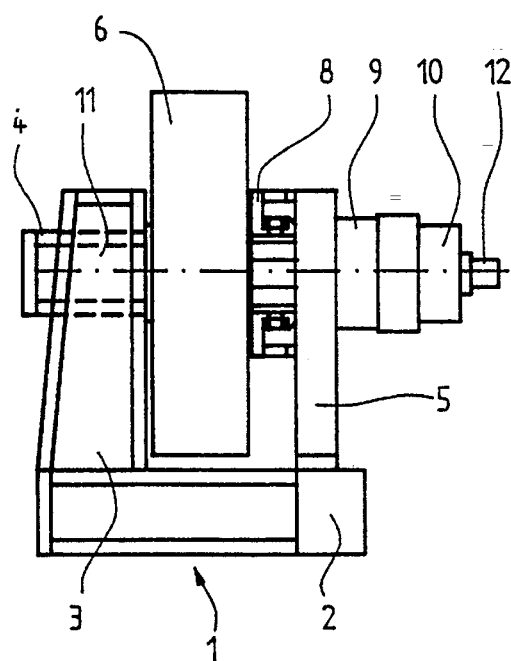
FIG. 1 is a side view of the driving machine according to the invention.
Figure 2:
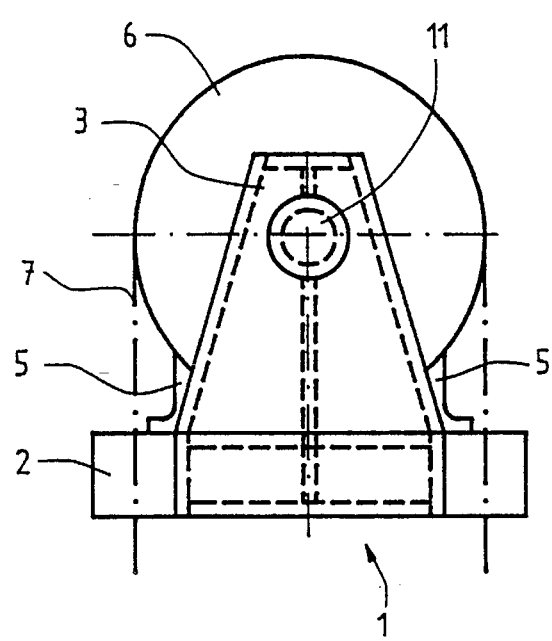
FIG. 2 is an end elevational view of the driving machine of FIG. 1.

Numeral 1 in FIGS. 1 and 2 denotes a machine frame including a base plate 2, a bearing block 3, an axle mount or retainer 4, as well as two vertically arranged elastic torque stays (supports) 5. The machine frame 1 is, for example, a welded construction composed of several parts. An axle 11 is fastened to and secured against rotation as well as axially affixed in axle mount 4 of bearing block 3. A drive pulley 6, for the driving of schematically shown hoist cables 7 of a lift or elevator is rotatably journalled on the protruding end of axle 11. A transmission (reduction gear) 8, an electric motor 9, a brake 10 and a rotation transmitter 12 are co-axially assembled and arranged to be overhung or cantilevered at drive pulley 6, and are operatively interconnected while being secured against rotation via two elastic torque stays 5 fastened at machine frame 1.

Figure 3:
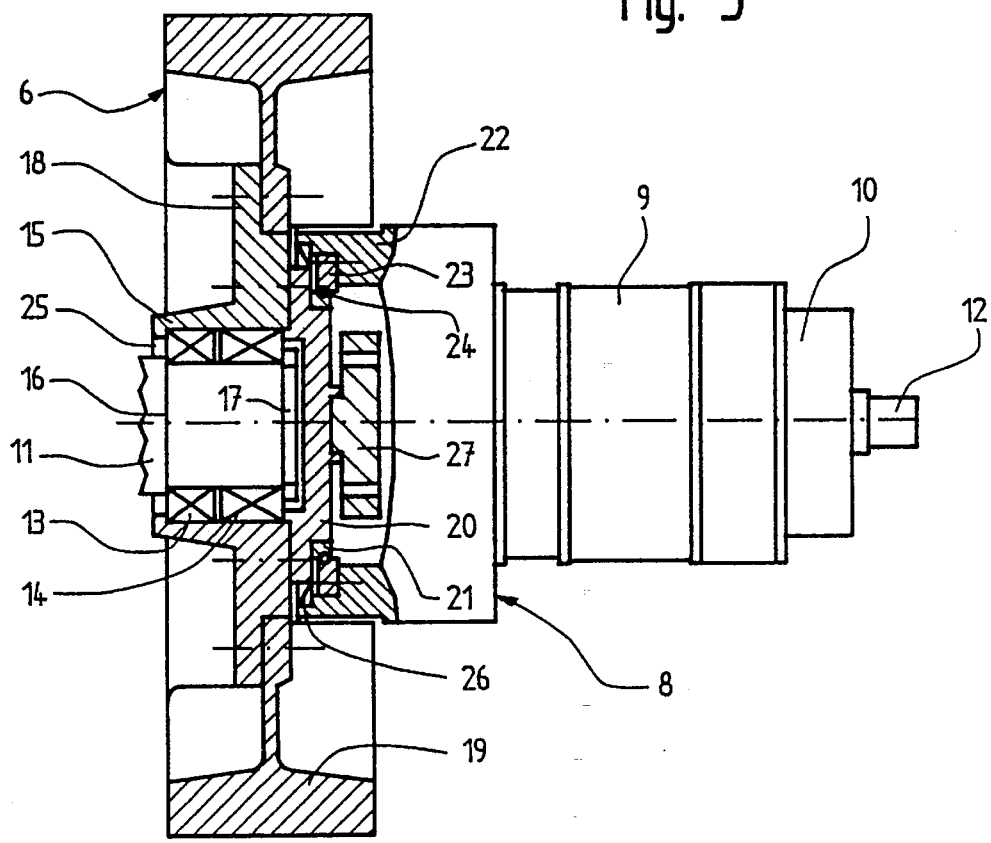
FIG. 3 is an enlarged partial cross-sectional view of a portion of the driving machine of FIG. 1.

According to FIG. 3, drive pulley 6 is journalled by means of two roller bearings 13 and 14, retained in a hub 15, on the free end of axle 11. Roller bearings 13 and 14 are in this instance retained between a shoulder 16 of axle 11 and a thrust washer 17 fastened at axle 11. A drive pulley rim 19 is fastened at a flange 18 of hub 15 and provided at the circumference thereof with a number of grooves, (not shown) for hoist cables 7 (FIG. 2) of the elevator. Flange 18 is joined together with an adapter plate 20, which covers the roller bearings 13 and 14, and which has a first bearing ring or race 21 fastened thereto. A second bearing ring or race 23, joined together with a housing 22 of transmission 8, is placed over the first bearing race 21, with rolling elements, in the form of balls 24, being interposed between bearing races 21 and 23. Bearing races 21 and 23, together with balls 24, form a rolling element bearing, by means of which transmission gear 8, together with electric motor 9 and brake 10, are journalled so as to be rotatable at drive pulley 6 and carried hereby. The drive pulley bearing on the axle 11 is sealed by an outer seal 25 and housing 22 of transmission 8 is sealed by an inner seal 26. A driving member 27, such as for example a conventional planetary transmission, is fastened to adapter plate 20.

Figure 4:
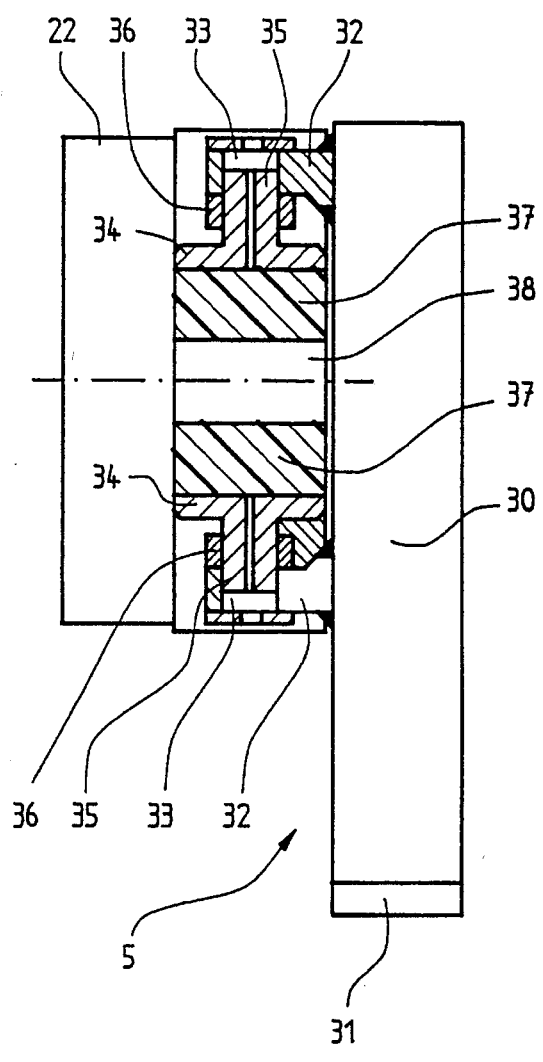
FIG. 4 is an enlarged scale sectional view of a torque stay of the driving machine of FIG. 1.
Figure 5:
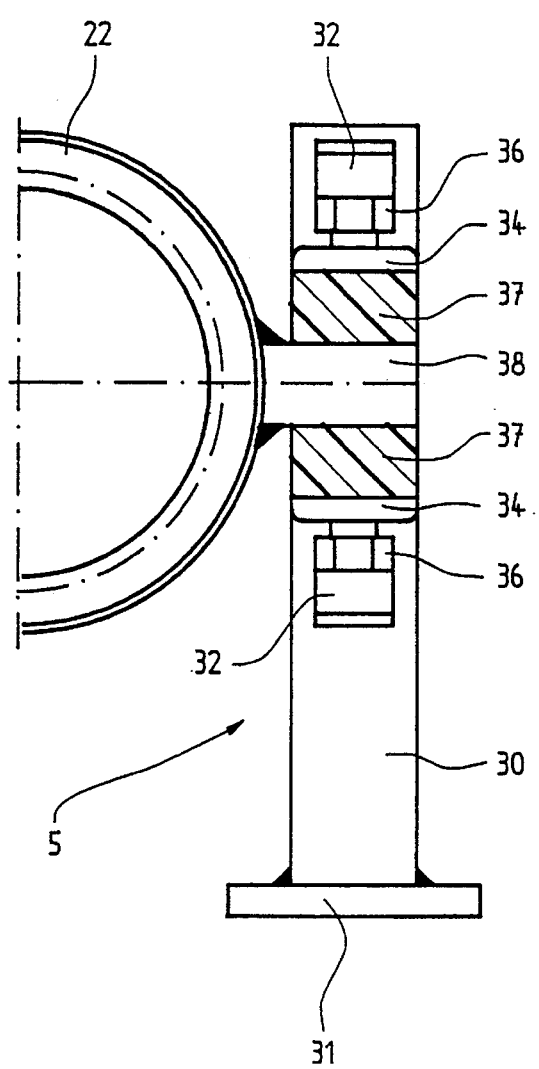
FIG. 5 is a side elevational view of the torque stay of FIG. 4.

Turning now to FIGS. 4 and 5, elastic torque stay 5 in the present embodiment includes a hollow profile 30 having a square cross-section, at which a pedestal plate 31 and two mounting members 32 are affixed, for example, by welding. Bores 33, the axes of which are in alignment and extend parallel to the longitudinal direction of hollow profile 30, are provided in mounting member 32. Two pressure plates 34, which are provided with outwardly directed cylindrical projections 35, are guided in bores 33 of mounting members 32. Nuts 36, which abut the mounts 32, are screwed onto external threads provided on cylindrical projections 35. Annular damping bodies 37, which for example may consist of elastic synthetic material or rubber, are provided between pressure plates 34. Two short radial levers 38, which are displaced 180° relative to each other and retained by and between the two damping bodies 37, are welded to housing 22 of the transmission 8, wherein the spacing between the pressure plates 34, and thus the degree of the damping, can be adjusted by resetting nuts 36.

The arrangement of this the invention fulfills the function of being a resilient and vibration-damped drive in that peak loadings and thereby possible damage to drive units 8, 9 and 10 are avoided during emergency stops or retention of the elevator car or cage by the safety catch or retention device. Due to the concentric and overhung or cantilever attachment of brake 10, motor 9 and transmission 8, these assemblies are easily accessible for maintenance, repairs and exchange.

In the at rest state of the driving machine, an imbalance between the elevator car and the counterweight, that results due to instantaneous load conditions, is conducted or transferred via drive pulley 6, transmission gear 8, motor 9 and the closed or actuated brake 10 into elastic torque stays 5 and absorbed there as load torque. Due to the elastic construction of the torque stays 5, the deflection in the one or other direction of rotation, which results in an imbalance between the elevator car and the counterweight is a measure of the driving or braking load occurring with respect to the elevator car. This information can be used in the command control for an optimization of the call requirement and in the drive regulation for the purpose of the compensation of the starting torque for the prevention of the sliding-back of the elevator car at start-up under the influence of load-caused counter torque. In the case of drives with unregulated polyphase induction motors, the starting jerk is reduced.

In place of the noted planetary gear, different further types and modes of constructions can be used as transmissions 8, or drives 8, 9 and 10, such as for example commercially available types of drives marketed under the product designations "Harmonic Drive" and "Cyclo" Drive etc. "Harmonic Drive" products are commercially available from ASS AG SCHWEIZ, CH-3186 Duedingen, Switzerland, with "CYCLO" drive products being commercially available from Sumitomo Machinery Corporation of America in the state of Virginia, U.S.A.

In a further variation, a hydraulic motor or a pneumatic motor can also be used in place of electric motor 9. The construction of the machine frame 1 is not restricted to welded constructions. Constructions of the cast type or prefabricated machine parts, which utilize standard parts, are also feasible.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A drive unit for an elevator comprising:

a machine frame including a base plate, a bearing block, an axle mount, and at least one vertically arranged elastic torque support;

an axle fastened to said machine frame, and secured against rotation, said axle being affixed in said axle mount;

a drive pulley for driving hoist cables of said elevator, said drive pulley rotatably journalled on a protruding end of said axle; and driving means for rotatably driving said drive pulley, said driving means extending from said drive pulley and said at least one elastic torque support securing a housing of said driving means against rotation;

wherein the drive pulley includes an adapter plate, with a first bearing race being attached to the adapter plate, with the drive means including a housing wherein a second bearing race is attached to the housing, with rolling element bodies being interposed between the first and second bearing races and thereby forming a rolling element bearing therewith, with the rolling element bearing journalling the drive means relative to the drive pulley.

2. A drive unit for an elevator comprising:

a machine frame including a base plate, a bearing block, an axle mount, and at least one vertically arranged resilient torque support;

an axle fastened to said machine frame, and secured against rotation, said axle being affixed in said axle mount;

a drive pulley for driving hoist cables of said elevator, said drive pulley rotatably journalled on a protruding end of said axle;

driving means for rotatably driving said drive pulley, said driving means extending from said drive pulley and said at least one resilient torque support securing a portion of said driving means against rotation.

3. The drive unit of claim 2, said driving means comprising:

a reduction gear;

an electric motor;

a brake; and a rotation transmitter;

said reduction gear, said electric motor, said brake, and said rotation transmitter being coaxially positioned to extend from said drive pulley and said at least one resilient torque support securing said reduction gear against rotation.

4. The drive unit of claim 3 comprising at least one radial lever, said at least one radial lever fixedly mounted to said reduction gear and secured against rotation by said at least one elastic torque support.

5. The drive unit of claim 3, wherein the at least one resilient torque stay comprises at least one mounting member and a pedestal plate, with each mounting member including pressure plates and damping bodies, with the damping bodies being interposed between radial levers and the pressure plates on at least one torque stay.

6. The drive unit of claim 5, wherein the pressure plate and the mounting member are adjustable relative to each other.

7. The drive unit of claim 5, wherein the damping bodies comprise an internally damped elastic material.

8. The drive unit of claim 2, wherein the drive means includes a planetary reduction gear, said reduction gear concentrically positioned between said motor and said drive pulley.

* * * * *